United States Patent [19]

Sneyd

[11] Patent Number: 4,848,047
[45] Date of Patent: Jul. 18, 1989

[54] SPHERICAL BUILDINGS

[75] Inventor: Douglas M. Sneyd, Orillia, Canada

[73] Assignee: Canadian Patents and Development Limited/Societe Canadienne des Brevets et D'Exploitation Limitee, Ottawa, Canada

[21] Appl. No.: 119,390

[22] Filed: Nov. 10, 1987

[30] Foreign Application Priority Data

Nov. 11, 1986 [GB] United Kingdom ............... 8626864

[51] Int. Cl.⁴ .................... E04B 1/32; E04H 14/00
[52] U.S. Cl. ........................................ 52/81; 52/171; 52/743
[58] Field of Search ............. 52/80, 81, 761, 306, 52/235, 171, 173, 483, 743

[56] References Cited

U.S. PATENT DOCUMENTS

| 3,255,557 | 6/1966 | Sturm | 52/483 |
| 3,846,951 | 11/1974 | Paull | 52/235 |
| 3,903,665 | 9/1975 | Harrison | 52/173 |
| 4,147,002 | 4/1979 | Kautz | 52/306 |
| 4,231,202 | 11/1980 | Dube | 52/171 |
| 4,471,584 | 9/1984 | Dietrich | 52/235 |
| 4,581,868 | 4/1986 | McCann | 52/235 |

Primary Examiner—James L. Ridgill, Jr.
Attorney, Agent, or Firm—Shoemaker and Mattare, Ltd.

[57] ABSTRACT

A building of generally spherical configuration has a lower portion and an upper portion and includes an outer skin of first triangular panels and an inner skin of second triangular panels. Substantially all of the panels are light-transmitting, and may be made of glass. Partitions extend from the lower to the upper portion of the building between the two skins and divide the inter-skin region into a plurality of sectors running from the lower to the upper portion of the building. Particulate insulative material is provided, along with apparatus for selectively filling the sectors with insulative material by delivering insulative material to the upper ends thereof, and to selectively empty the sectors of insulative material by withdrawing insulative material from the bottom ends thereof. The building can be controlled in such a way as to allow open or empty sectors to track the sun in the winter, thus maximizing solar heating, and to face away from the sun in hot weather, thus minimizing overheating while allowing light entry.

7 Claims, 8 Drawing Sheets

SPHERICAL BUILDINGS

This invention relates generally to spherical or quasi-spherical building structures

BACKGROUND OF THIS INVENTION

Spherical and quasi-spherical building structures are already known, and many of these are based on geodesic or quasi-geodesic geometry. Patents and publications in the name of Buckminster Fuller may be referred to for an understanding of the basic concept.

GENERAL DESCRIPTION OF THIS INVENTION

In its preferred form, the building to be described herein is generally spherical, with the spherical wall consisting of an outer skin of triangular panels and an inner skin of triangular panels. The two skins are spaced from each other to allow particulate insulative material to be introduced to or exhausted from a plurality of vertically extending sectors into which the inter-skin volume is divided by partitions. Control means are provided to allow sectors to be selectively filled or emptied, with the intention that temperature control within the building can be facilitated by opening and closing various sector "windows" in such a way as to be directed toward or away from the sun, depending upon the season of the year. As the sun follows its apparent motion from east to west, the window just described can track around the building to follow the sun in the winter, and can be presented away from the sun in the summer.

More particularly, this invention provides a substantially spherical building having a lower portion and an upper portion, both portions being above ground, the building comprising:

an outer skin of first triangular panels, at least some of the first panels being light-transmitting, all adjacent panels of the outer skin being separated by a weather-proof bead of resilient material, an inner skin of second triangular panels in registry with but spaced inwardly from the first panels, at least some of the second panels that register with light-transmitting first panels being also light-transmitting, a framework of struts between the skins and supporting all panels, a plurality of partitions extending from the lower to the upper portion of the building along panel edges and between the skins, the partitions dividing the inter-skin region into a plurality of sectors running from the lower to the upper portion of the building, a store of particulate insulative material, and means adapted to selectively fill the sectors with insulative material by delivering insulative material to the upper ends thereof and to selectively empty the sectors of insulative material by withdrawing insulative material from the bottom ends thereof.

Further, this invention provides, for a spherical building having a lower portion and an upper portion, both portions being above ground, the building comprising:

an outer skin of first triangular panels, at least some of the first panels being light-transmitting, all adjacent panels of the outer skin being separated by a weather-proof bead of resilient material, an inner skin of second triangular panels in registry with but spaced inwardly from the first panels, at least some of the second panels that register with light-transmitting first panels being also light-transmitting, a framework of struts between the skins and supporting all panels, a plurality of portions extending from the lower to the upper portion of the building along panel edges and between the skin, the partitions dividing the inter-skin region into a plurality of sectors running from the lower to the upper portion of the building, a store of particulate insulative material, and means adapted to selectively fill the sectors with insulative material by delivering insulative material to the upper ends thereof and to selectively empty the sectors of insulative material by withdrawing insulative material from the bottom ends thereof:

a method for controlling the internal temperature of the building, comprising:

(a) in cold, sunny weather, keeping clear of insulative material at least one sector against which sunlight is falling, and filling with insulative material substantially all of the non-sun-directed sectors, thus providing a window through which sunlight can enter the building, and tracking the sun by clearing sun-directed sectors in sequence around the building; and (b) in warm, sunny weather, keeping filled with insulative material all sectors which are directed toward the sun.

GENERAL DESCRIPTION OF THE DRAWINGS

One embodiment of this invention is illustrated in the accompanying drawings, in which like numerals denote like parts throughout the several views, and in which.

Figure 1:
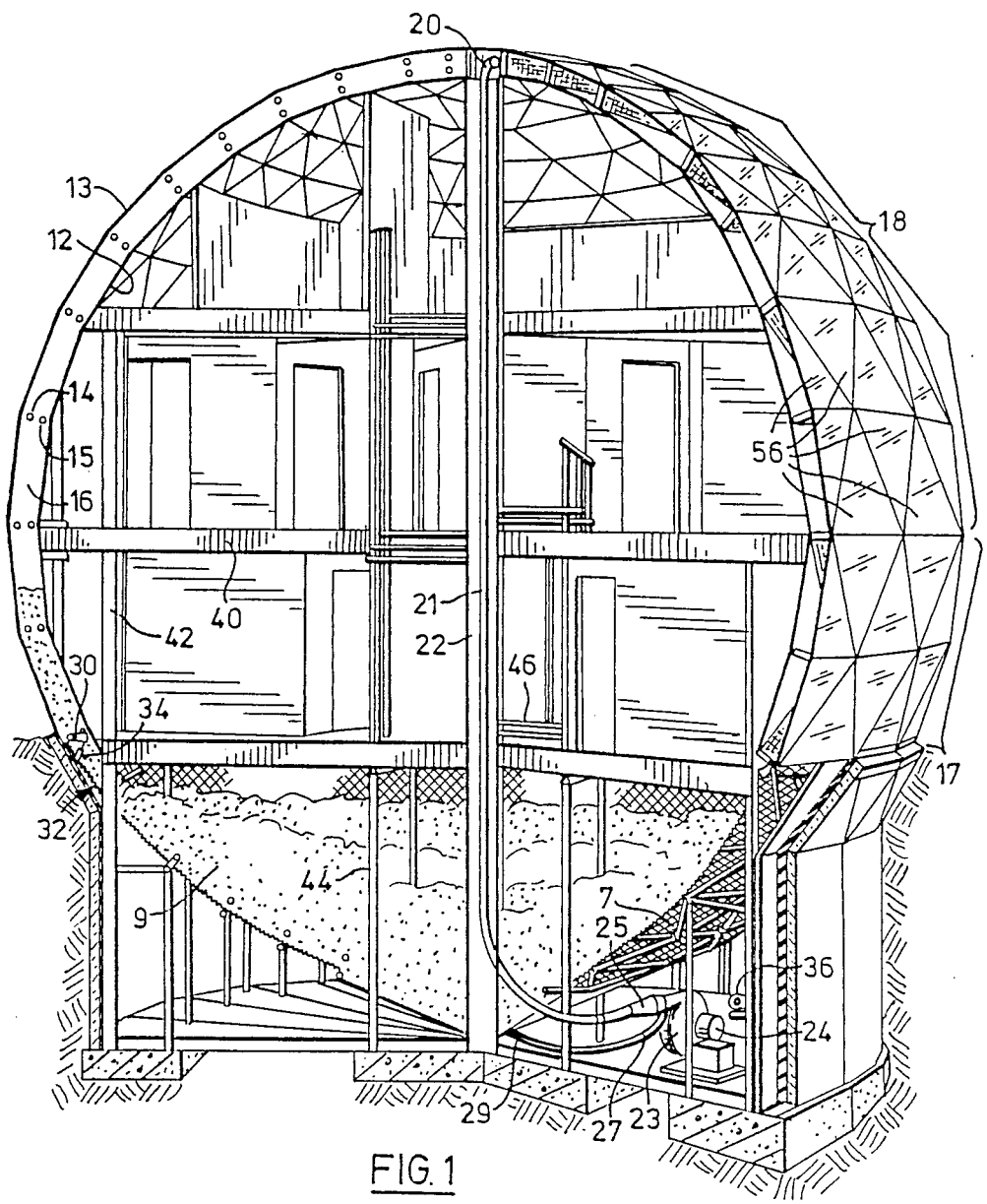
FIG. 1 is a perspective, partly broken-away view of a building constructed in accordance with this invention.
Figure 9:
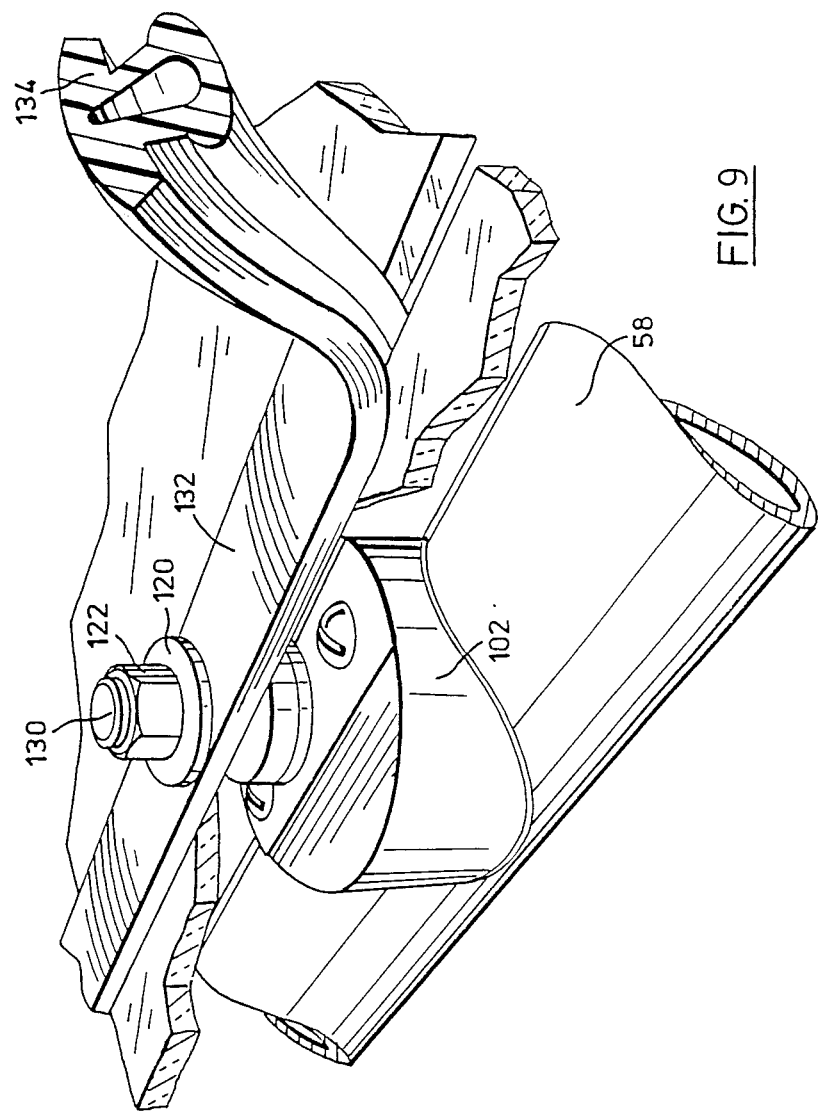
Figure 10:
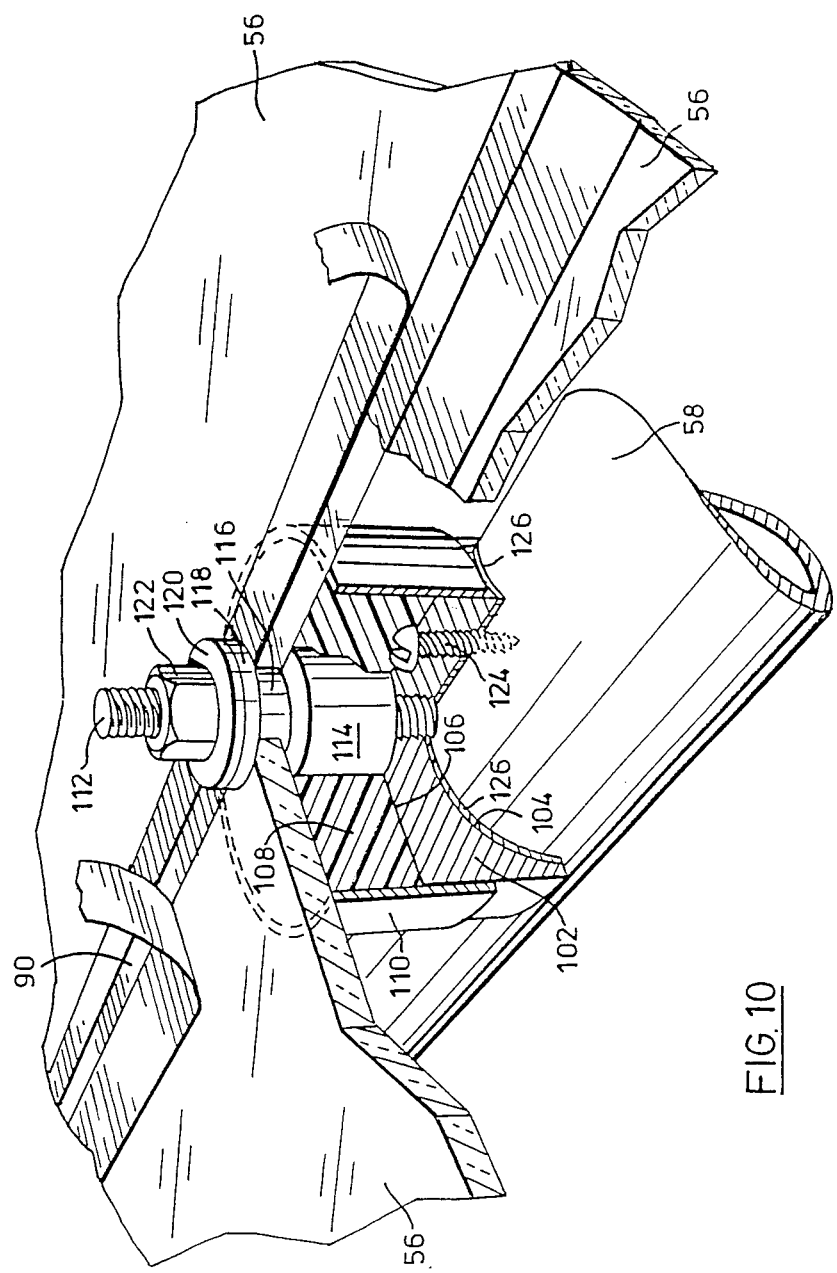
Figure 11:
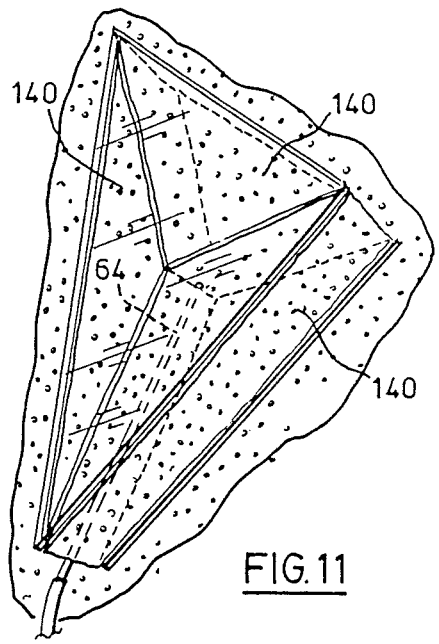
Figure 12:
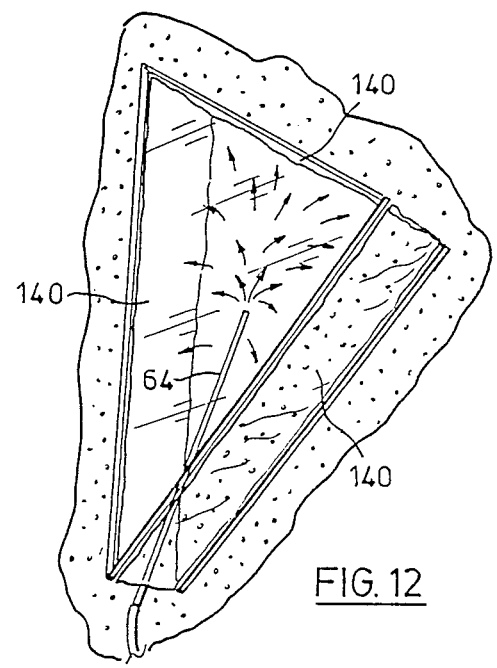
Figure 13:
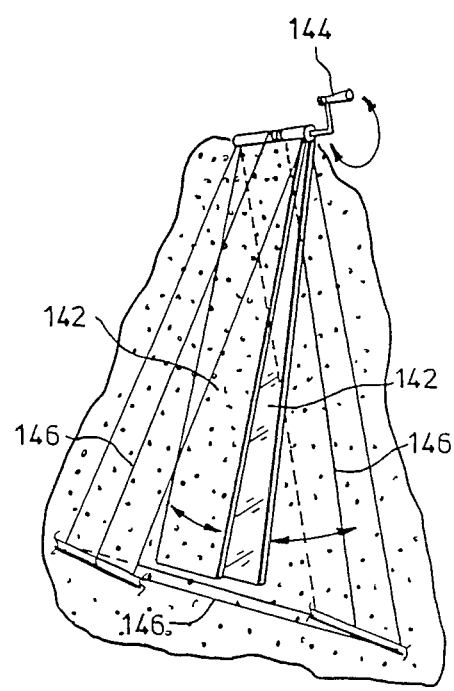

FIG. 9 is a partial perspective view of an alternative support for the transparent panels making up the inner skin of the building of FIG. 1; and FIG. 10 is a partial perspective view of an alternative support for the transparent panels comprising the outer skin of the building of FIG. 1; and FIGS. 11, 12 and 13 are partial perspective views of openable window structures through the wall of the building.

DETAILED DESCRIPTION OF THE DRAWINGS

Attention is first directed to FIG. 1, which shows a building generally at 10, having an inner glass wall 12 and an outer glass wall 13. These walls define an internal or intermediate space which will be referred to herein as the bead wall 16. In the preferred embodiment, both the inner glass wall 12 and the outer glass wall 13 consist of a plurality of triangular panels arranged edge to edge in a geodesic or quasi-geodesic pattern. The bead wall 16 is intended to act, during weather or extreme temperatures, as a highly insulative barrier, and to this end it is part of this invention to provide particulate insulation material, particularly polystyrene insulation beads 9, which may be blown into the bead wall 16 or removed therefrom.

Within the bead wall 16, i.e. between the outer glass wall 13 and the inner glass wall 12, the actual geodesic support structure or structures are provided. In the embodiment shown in FIG. 1, there are provided two geodesic steel or aluminum structures 14 and 15, constituting the outer and inner geodesic frameworks. As an alternative, but not illustrated herein, both the glass walls 12 and 13 could be supported by a single geodesic framework.

In the preferred embodiment, the outer and inner glass walls 12 and 13 are separated by a spacing of approximately 14 inches, and the inter-wall volume, i.e. the bead wall 16, is divided more or less vertically into sectors or segments reaching from the lower portion 17 to the upper portion 18 of the building 10. These sectors may be defined by partitions which follow the joined edges of the triangular panels, either in a spiralling fashion (thus angulated) up the building, or in a zig-zag pattern which follows a more or less vertical orientation. The partitions may be of glass, fabric, or any other suitable material which will not allow the particulate insulation beads to pass from one sector to another.

The polystyrene insulation beads 9 are supported within a net bag 7, and can be withdrawn from this storage location in what is effectively the basement of the building and blown into the vertical sectors at the top thereof from a mechanized rotatable spout 20 at the upper end of a conduit 21 which extends vertically through a central passageway 22 in the building. The passageway 22 may also be utilized for plumbing, electrical and other pipes and lines.

More particularly with regard to the apparatus for moving the beads, it will be seen in FIG. 1 that there is provided a rotary blower 23 powered by a motor 24, and mounted securely on the basement floor. The blower 23 impels air through a venturi unit 25 which has a lateral infeed 27 connected to a conduit 29 which extends from the bottom of the net 7, and thus is in communication with the store of polystyrene insulation beads.

While the building shown in FIG. 1 is a full-size three-floor building suitable for a residence or small office building, it will be appreciated that a similar structure could be used in smaller spheres, where it may be undesirable to have any central or axial structure. In such cases, it can be desirable to run the conduit 21 up the bead wall itself, i.e. between the outer and inner skins of triangular panels, to the top of the sphere. In such smaller spheres, the partitions defining the sectors would preferably not run to the top of the sphere, but would stop sufficiently short of it to permit a common fill of all sectors at the same time.

The polystyrene insulation beads can be drained selectively from one or any number of sectors back into the net bag 7 by means of swing vents 30 located either at ground level for each sector, or somewhat below ground level so that they are out of sight. For example, in FIG. 1 the location of the swing vent 30 could be at the arrow 32. The swing vents 30 are opened and shut by pneumatic cylinders 34 that move the swing vents 30 between open and closed positions. An air compressor 36 is provided for running the pneumatic cylinders 34. It will be appreciated that the level of the beads in each sector are governed by the length of time that the swing vents 30 are left open for draining, or by the length of time the venturi fan combination 23, 25 is activated. Proper bead levels to suit weather conditions and the occupant's needs may be produced by means of a computer which is programmed to use sensing devices and thermostats. The levels may also be achieved by a manual override. It will be appreciated that means other than the swing vents 30 can be utilized to control the draining the of the beads from the various sectors.

One of the main objectives of this invention is to provide a spherical or quasi-spherical glass wall in which an aperture of any size can be formed which can track the sun in winter and avoid it in summer, thus providing maximum usage of solar heating in winter and maximum usage of a movable insulated shade wall in summer. Heating and cooling units could also be provided as necessary to constitute back-up systems.

Although this invention has been disclosed in association with a substantially spherical building, it will be understood by those skilled in the art that the principles of the invention could also be applied to semi-spherical, quasi-spherical, or even non-spherical buildings and additions to existing buildings.

For aesthetic, viewing, privacy and other reasons, the beads can be relocated to an infinite number of desired levels and locations, from a full bead wall to an empty one.

In FIG. 1, the building is shown to include an interior structure incorporating floor joisting 40, partition walls 42, vertical supports 44, and a circular stairway 46 surrounding the passageway 22. However, none of this internal structure is necessary in order to support the outer walls of panels, since it is well known that geodesic structures are self-supporting. Indeed, it is preferred that the internal structure stand by itself and not rely for support on the outer skin, and vice versa.

In order to accommodate thermal expansion and contraction of the triangular panels secured to the outer geodesic frame 14, it was necessary to devise a method of securing the glass triangles 56 on resilient support pads with ample resilient beads between the adjacent glass edges, the beads providing for thermal contraction and expansion, while maintaining a watertight seal between panels. To accomplish this, in accordance with one embodiment of this invention, a panel support structure is employed, which employs a temporary means for keeping the glass panels in position while a resilient support pad under the panel cures.

Figure 2:
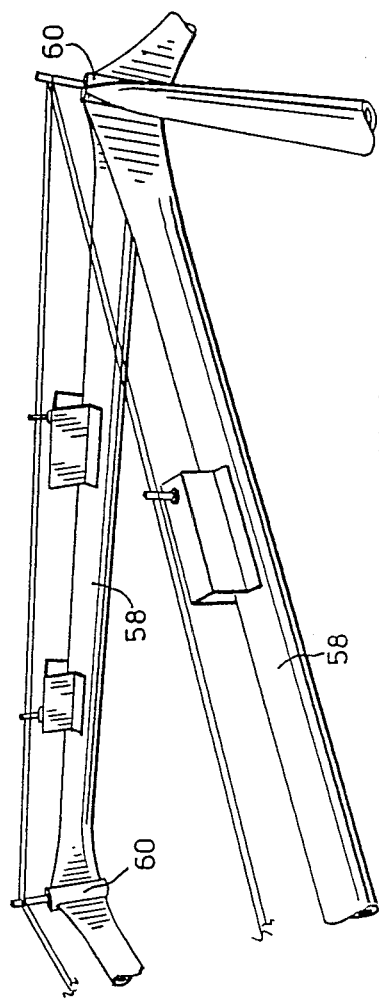
FIG. 2 is a partial view of interconnected struts forming part of the support for the outer skin of panels for the building of FIG. 1.
Figure 3:
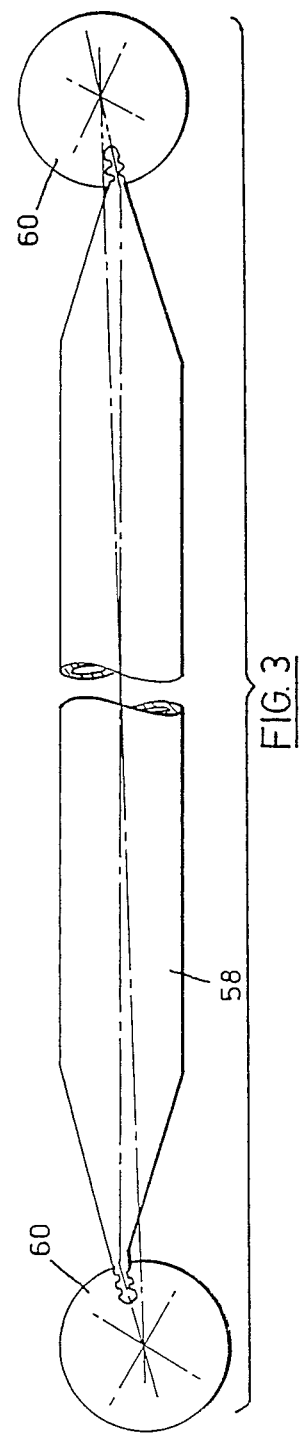
FIG. 3 is a schematic drawing of one tubular strut extending between two support, illustrating the reason for the panel edges being to some extent misaligned with the axis of the corresponding tubular strut.

To explain this, attention is first directed to FIG. 2, which shows a plurality of struts 58 which are part of the outer geodesic structure 14. The struts are tubular over most of their length, but at the ends they are crimped or flattened, as clearly seen in FIG. 2, so as to fit into slots which are machined axially into solid aluminum connectors 60. See FIG. 3 for a further illustration. Due to the nature of a geodesic dome, and as particularly well illustrated in FIG. 3, the axis of a tubular strut 58 is not precisely in alignment with a line drawn between the axial centres of the supports 60 at either end. Because of the frequency at which this misalignment occurs in a typical geodesic structure, and because the triangular glass panels must have their edges in precise alignment with a line between the axes of the supports 60, rather than with the axis of the tubular strut 58, it was important, during the development of this invention, to devise a means by which to simply and easily support the glass panels during the curing of the resilient pads and inter-panel seals.

Figure 5:
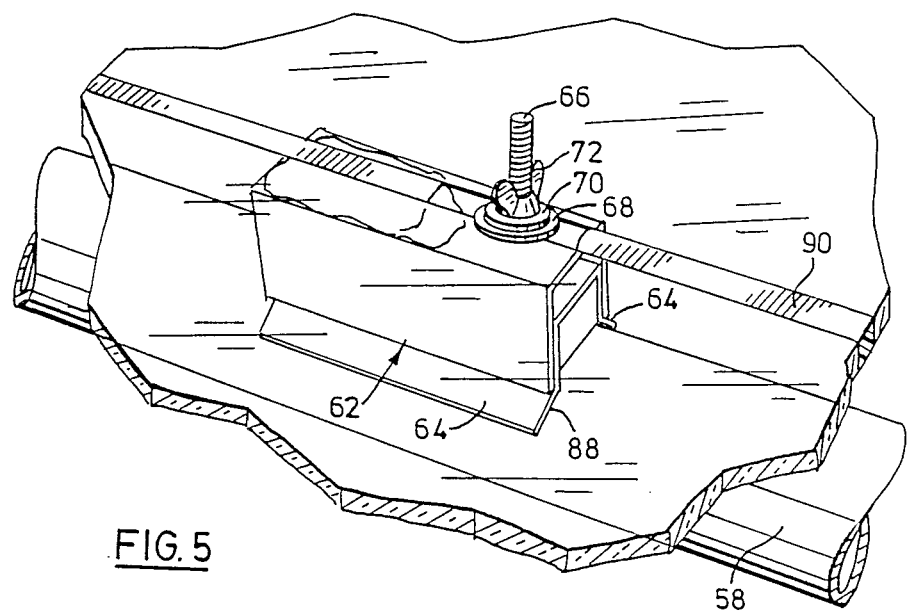
FIGS. 5, 6 and 7 show a portion of a tubular strut, and one embodiment of a connecting support for transparent panels.
Figure 8:
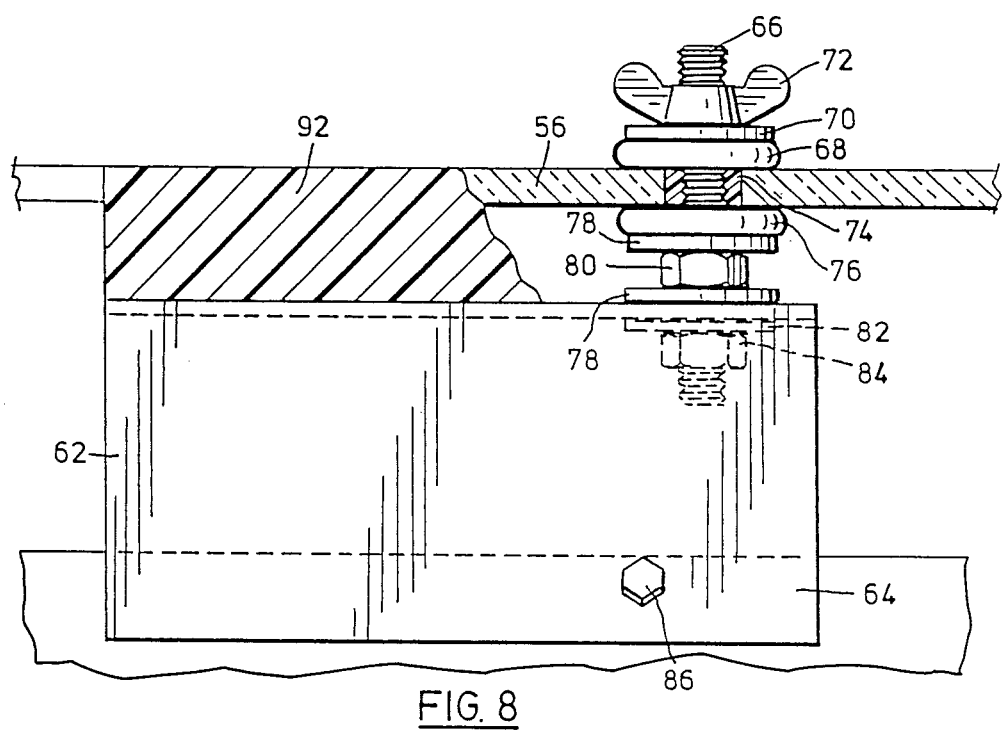
FIG. 8 is an elevational view of one such support.

Looking at FIG. 5, there is provided, in accordance with one embodiment of this invention, a steel support bracket 62 having essentially a rectangular configuration with sloping marginal portions 64 taking up angles which would allow them to lie in substantial surface contact with a tubular strut 58 against which the bracket 62 was placed. Extending upwardly from and threaded into the bracket 62 is a temporary shaft 66 around which is placed a resilient pad 68, then a washer 70, then a wing nut 72 in threaded engagement with the shaft 66. As can be seen in FIG. 8, a silicone washer 74 is placed around the shaft 46 at the level of the panels 56, and a further washer 76 is located immediately below the panels 56, again surrounding the shaft 66. The washer 76 is spaced above the bracket 62 by two steel washers 78 separated by a nut 80. Inside the bracket 62 is located a further washer 82 and a nut 84.

Figure 7:
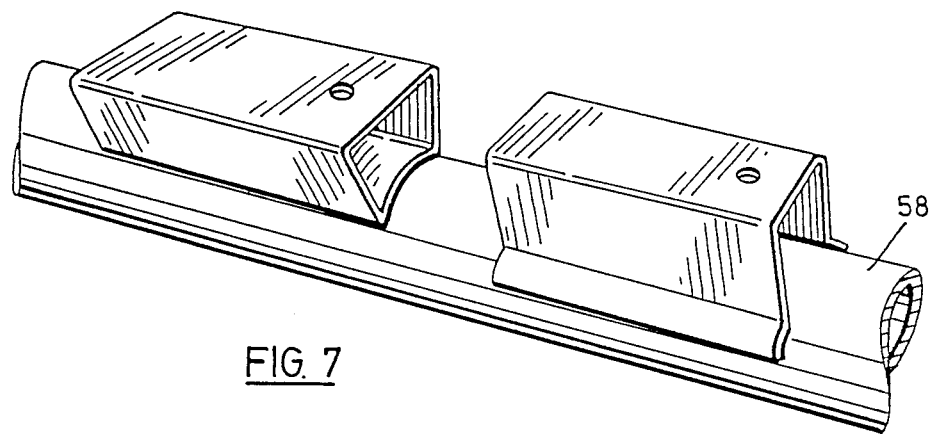

During assembly of the building, after the geodesic structure has been completed to form the outer frame 14, alignment strings are stretched between the axes of the various supports 60 at the ends of the tubular struts, the strings thus defining a line in perfect alignment with the proposed edges of the triangular panels 56. The brackets 64, with all of the elements 66, 74, 76, 78, 80, 82 and 84 in place, but without the elements 68, 70 or 72, are set in pairs at spaced locations along the various struts in such a way that the shafts 66 intersect the stretched string. When this position is achieved, then the bracket 62 can be secured and placed against the strut, either by threaded fasteners 86 as shown in FIG. 8, or by two-sided tape as seen at 88 in FIG. 5. FIG. 7 illustrates two possible embodiments of the bracket 62, without the shafts 66 and associated elements being illustrated, and particularly illustrates the possibility for shifting the brackets peripherally around the strut 58 prior to securement.

As seen in FIGS. 5 and 8, after the glass panels 56 are secured in position by the temporary means 66-84 shown in FIG. 8, a silicone bead 90 can be applied between the adjacent glass panel edges, and additionally a quantity 92 of silicone or other resilient material can be applied between the top of the bracket 62 and the portions of the glass panels immediately overlying the bracket. In order to contain the silicone, temporary vertical walls, possibly in the form of a rectangular sleeve, can be provided around the bracket 62 and extending up to the glass. Such a sleeve would be put into place before the glass panels are applied. In order to establish the bead 90 between the adjacent edges of the glass panels, the following procedure can be followed. First, removable tape can be applied along the outer margins of the adjacent panel edges, and a temporary dike bridging between the panels at the inner margins can be put into place, the dike can be another piece of tape spanning between the glass panels 56, or it can be a portion of a cut tube placed with the convex side projecting partly into the inter-panel space, the tube portion being then taped into position. The dike element should, of course, be covered with a release layer. Once these steps have been taken, then silicone or other resilient sealing material can be injected into the space between the two facing edges of the glass panels, and screened off from the top or outside in order to bring it flush with the outer surfaces of the panels. Once the resilient material has dried or set, the dike can be removed, and the tape can be stripped away.

For the inside glass wall 12, which is put into place after the outside wall has been constructed, it will be appreciated that it is not possible work freely with the inner glass panels from the region between the two walls. In the case of the inner panels, all of the steps described above are followed up to the point where the panels are mounted on the shafts 66, and then (since it is not necessary to seal the inner skin against the intrusion of weather) a resilient seal element can simply be snapped into place between adjacent panel edges.

Figure 6:
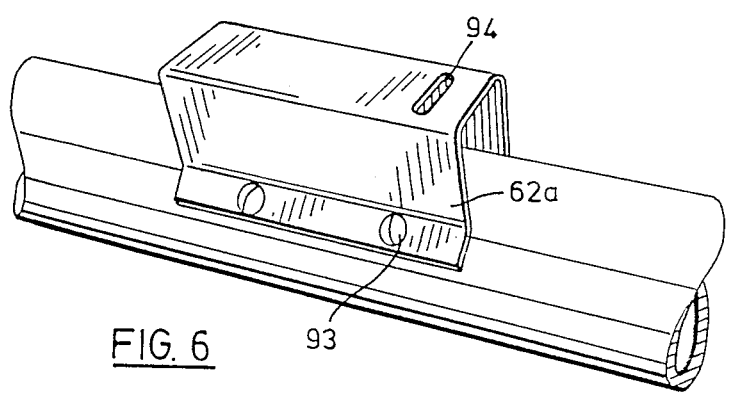

FIG. 6 shows a further variant of the bracket 62, wherein the bracket 62a is permanently affixed by fasteners 93 in the approximately correct position, as judged by eye, and then the shaft 66 (FIG. 5) is put into position in the elongated transverse slot 94, and aligned with the string prior to being tightened.

Although the rectangular brackets 62 shown in FIGS. 5, 6 and 7 are satisfactory in function, they do have the disadvantage that the polystyrene or other plastic insulation beads tend to build up on top of the brackets located on horizontal strut members and to remain there when the particular segment has been evacuated, or conversely they shield a portion of the segment from beads (i.e. the portion directly under the brackets) when a segment is filled with the beads. In order to avoid this inconvenience, the bracket 100 shown in FIG. 10 is provided as an alternative. The bracket 100 includes a steel or aluminum base 102 which has a lower surface 104 complementary with the strut 58, and which has a flat upper surface 106. Above the flat upper surface 106 is a silicone pad 108 which is enclosed in a silicone sleeve 110. The base 102 has a threaded central bore which receives a shaft 112, around which is located a silicone washer 114 extending up to support the edges of the glass panels 56, a silicone washer 116 to cushion the glass around the shaft 112, a further silicone washer 118 above the glass, and a washer 120 and nut 122, the latter clamping all of the various parts together and holding the glass panels 56 securely in position. The base 102 can be secured to the strut 58 either by threaded fasteners 124 or by two-sided tape 126, or both. With the bracket 100 shown in FIG. 10, the method for applying the inter-panel bead 126 is the same as previously described.

In FIG. 9, which is directed to the installation of the inner wall of glass panels, the steel or aluminum support 102 is substantially the same as that in FIG. 10, and is secured to the strut 58 in the same way. However, the pad 108 of silicone material is not present and does not need to be provided. The shaft 112 is replaced by a bolt 130, and the nut 122 applies directly against a metallic washer 120 which bears down and holds in position the prefabricated snap-in sealing element 132. The element 132 has the section shown at 134, and is perforated at intervals to accept the bolt 130.

FIGS. 11 and 12 show a triangular window in the bead wall 16 spreading the beads apart by means of an air tube blowing air into the area and spreading three plastic bags 140 apart. By sucking air in, the tube 64 brings the bags 59 together again. Such triple bags would be located only in selected triangles.

FIG. 13 shows a manually operated window with two transparent boards 142 that can be cranked together or apart by a crank 144, thus moving the beads, by means of a wire connection 146.

Figure 4:
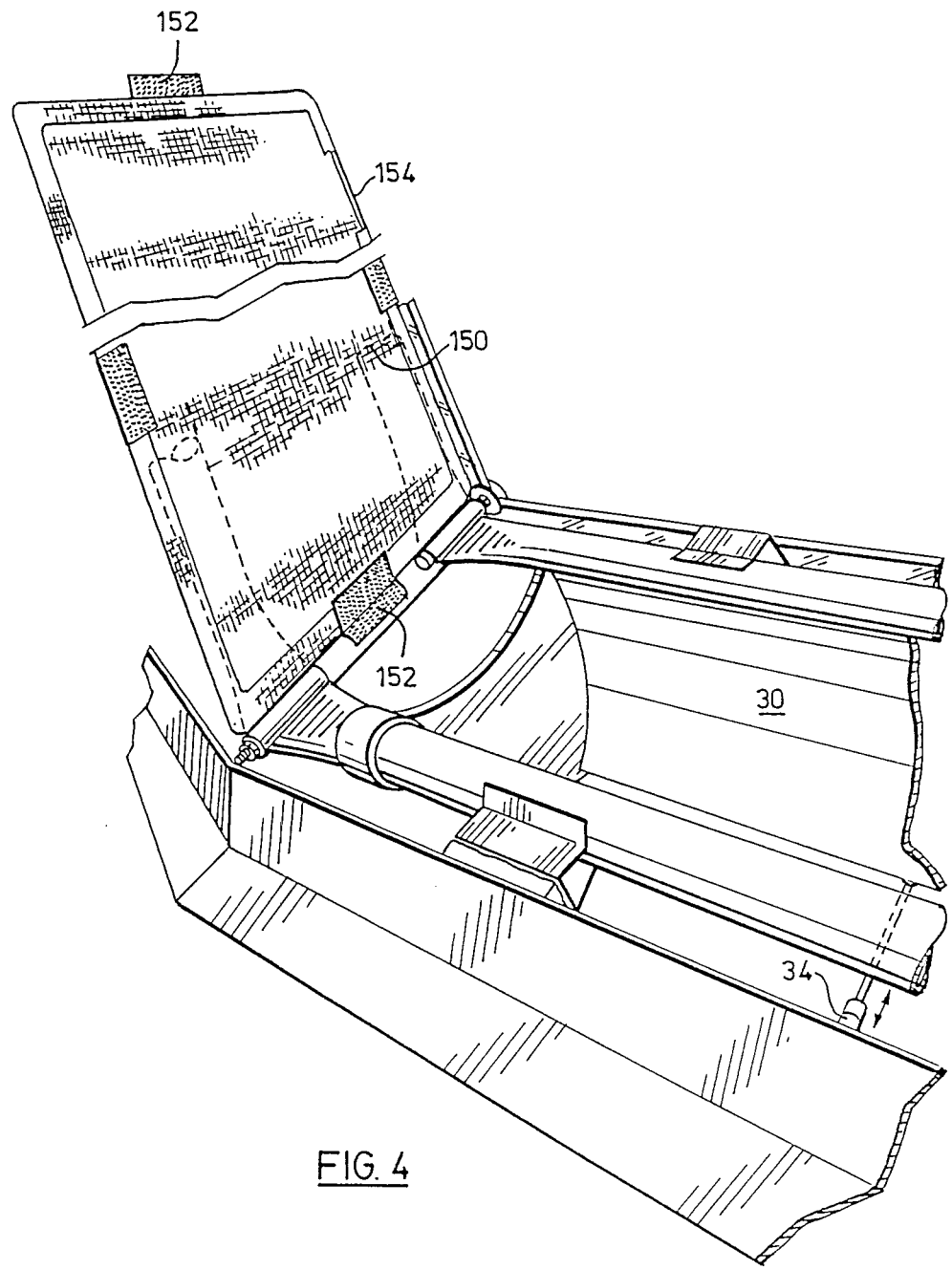
FIG. 4 is a partial perspective view of one portion of the inter-skin region of the building of FIG. 1.

FIG. 4 shows the swing vent 30 and pneumatic cylinder 34. It should be noted that several vents could be located horizontally at different levels along a segment between the grade and the top of the sphere. FIG. 4 also shows a fabric partition 150 secured along the vertices between glass panels. The partition 150 can be held in place by Velcro fasteners 152, and can be held in relatively stiff position by rods 154 to which it is connected by Velcro flaps.

In addition to providing low cost heating, cooling and maintenance, the structure of this invention provides an easy, build-yourself design suitable for anyone capable of using a wrench and caulking gun. It should further be noted that the components can be mass-produced, containerized and shipped worldwide for easy on-site construction. Through mass-production, costs can be held to a minimum.

The glass triangles 56 require on-site measurement only for the first building of a number of identical buildings. Once the measurements are made for the first building to be erected, the same sizes would apply to other identical buildings. This means that, after the measurements have been initially taken, the different triangular glass panels can be mass-produced at low cost.

While one embodiment of this invention has been illustrated in the accompanying drawings and described hereinabove, it will evident to those skilled in the art that changes and modifications may be made therein without departing from the essence of this invention, as set forth in the appended claims.

The embodiments of the invention in which an exclusive property or privilege is claimed are defined as follows:

1. For a spherical building having a lower portion and an upper portion, both portions being above ground, the building comprising:
   an outer skin of first triangular panels, at least some of the first panels being light-transmitting,
   all adjacent panels of the outer skin being separated by a weather-proof bead of resilient material,
   an inner skin of second triangular panels in registry with but spaced inwardly from the first panels, at least some of the second panels that register with light-transmitting first panels being also light-transmitting,
   a framework of struts between the skins and supporting all panels,
   a plurality of partitions extending from the lower to the upper portion of the building along panel edges and between the skin, the partitions dividing the inter-skin region into a plurality of sectors running from the lower to the upper portion of the building,
   a store of particulate insulative material,
   and means adapted to selectively fill the sectors with insulative material by delivering insulative material to the upper ends thereof and to selectively empty the sectors of insulative material by withdrawing insulative material from the bottom ends thereof;
   a method for controlling the internal temperature of the building, comprising:
   (a) in cold, sunny weather, keeping clear of insulative material at least one sector against which sunlight is falling, and filling with insulative material substantially all of the non-sun-directed sectors, thus providing a window through which sunlight can enter the building, and tracking the sun by clearing sun-directed sectors in sequence around the building; and
   (b) in warm, sunny weather, keeping filled with insulative material all sectors which are directed toward the sun.

2. The invention claimed in claim 1, in which step (b) further includes ensuring that any sectors cleared of insulative material are ones directed away from the sun.

3. A substantially spherical building having a lower portion and an upper portion, both portions being above ground, the building comprising:
   an outer skin of first triangular panels, at least some of the first panels being light-transmitting,
   all adjacent panels of the outer skin being separated by a weather-proof bead of resilient material,
   an inner skin of second triangular panels in registry with but spaced inwardly from the first panels, at least some of the second panels that register with light-transmitting first panels being also light-transmitting,
   a framework of struts between the skins and supporting all panels,
   a plurality of partitions extending from the lower to the upper portions of the building along the panel edges and between the skins, the partitions dividing the interskin region into a plurality of sectors running from the lower to the upper portion of the building,
   a store of particulate insulative material,
   and means adapted to selectively fill the sectors with insulative material by delivering insulative material to the upper ends thereof and to selectively empty the sectors of insulative material by withdrawing insulative material from the bottom ends thereof.

4. The invention claimed in claim 1, in which said means includes an air blower, a first conduit through which air is blown by said blower, said first conduit having a downstream end located centrally of the upper ends of the various sectors defined by the partitions, a venturi suction unit in the first conduit downstream of the blower, said unit providing a lateral infeed for particulate insulative material such that, when air is being blown through the unit, suction is created at said lateral infeed, and a second conduit extending from said store of particulate insulative material to said lateral infeed.

5. The invention claimed in claim 1, in which said struts are tubular and generally follow the edges of the triangular panels, the panels being supported in spaced relation from the struts by means of support units, each support unit comprising:
   a body member having an inner surface complementary to the other surface of the strut, said outer surface being cylindrical,
   securement means fastening the body member against its respective strut,
   a shaft supported by the body member at right angles to the strut axis and projecting beyond the body member,
   a resilient sleeve around the shaft immediately outwardly of the body member, the sleeve being dimensioned to pass snugly between adjacent panels,
   and clamp means secured on the shaft externally of the panels, the clamp means being wider than the inter-panel spacing and pressing resiliently inwardly against the panels to press them against the body member.

6. The invention claimed in claim 1, 2, 3, 4 or 5, in which the particulate insulative material is composed of a plurality of discrete polystyrene beads.

7. The invention as claimed in claim 1, in which the body member is substantially cylindrical with its axis normal to the axis of the said inner surface.

* * * * *